D. GAMET.
APPARATUS FOR PURIFYING ILLUMINATING GAS.
No. 1,656.                  Patented June 27, 1840.
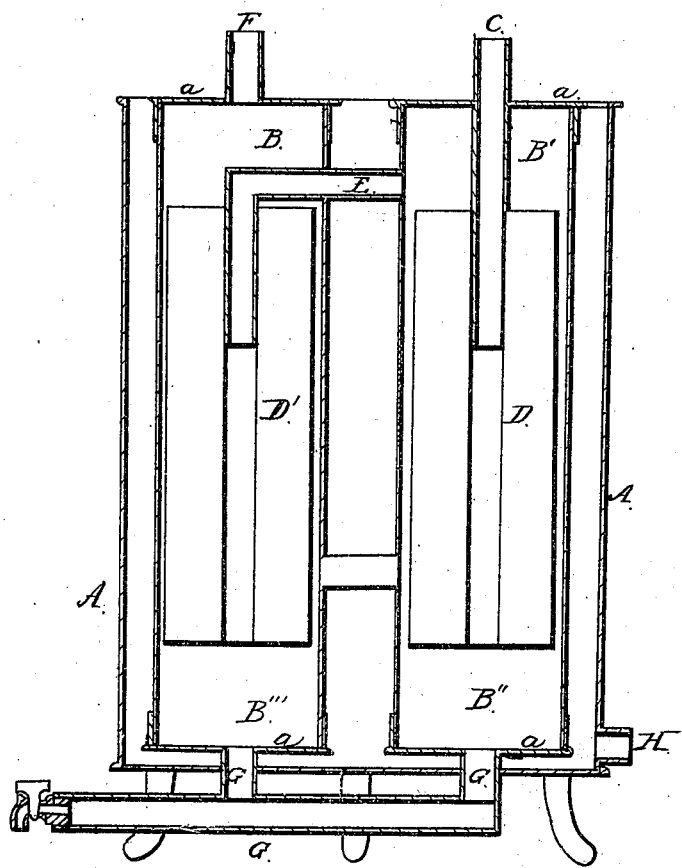

UNITED STATES PATENT OFFICE.

DANIEL GAMET, OF RICHFIELD, NEW YORK.

APPARATUS FOR PURIFYING GAS FOR ILLUMINATION.

Specification of Letters Patent No. 1,656, dated June 27, 1840.

*To all whom it may concern:*

Be it known that I, DANIEL GAMET, of Richfield, in the county of Otsego and State of New York, have invented an Improved Portable Apparatus for the Purification of Carburated Hydrogen Gas Produced from Wood for the Purpose of Illumination, which apparatus is to be employed as an article of domestic economy, the gas being produced by the fires used in cooking-stoves or for other purposes; and I do hereby declare that the following is a full and exact description thereof.

For generating the gas I use chips, or small pieces of hickory, oak, or other species of hard wood employed as fuel; and these pieces, or chips I put into a kettle, or other suitable metallic vessel having a lid fitting it closely, and a tube leading from it, to conduct off the gases and vapors which may be generated by heat. This vessel may fit into an opening in the top of a stove, or it may be in the form of a tube passing through, or back of the fire, in such manner as shall adapt it to the situation in which it is to be used. I do not make claim to any particular construction of apparatus for this purpose; the nature of which apparatus is well known, but confine my claim to the particular apparatus for purifying the gas, as invented by me.

In the accompanying drawing this apparatus is shown in section, A, A, being a cylindrical vessel of tin, or other suitable material, for containing water. B, B', are two other cylindrical vessels which are to be surrounded by the water contained in the vessel A A; these last cylinders are inclosed at each end by heads $a$, $a$, and through these vessels the gas is to circulate.

C, is a tube connected with the vessel in which the gas is generated.

D, is a perforated cylinder of wood, or other material, filling a large part of the cavity of the cylinder B', and D', a similar cylinder within B.

The tube C, conducts the gas down into the cavity in D, through which it passes into the space B'', where a large portion of the vapors will be condensed and deposited, in the form of an impure pyroligneous acid. The uncondensed vapor will thence ascend through the annular space around the cylinder D, into the space B'; thence it will pass through the tube E, descend into the space B''' where the remainder of the condensable vapor will be deposited, and the purified gas will ascend around the cylinder D', into the space B, whence it is to be conducted off by the tube F, to the burners intended to be supplied.

G, G, are tubes for the drawing off the condensed fluid, when necessary; and H, a tube for drawing off the water from the cylinder A, A.

The whole of this apparatus may be inclosed, if desired, in a wooden case. I have found in practice that the circuit which the gas is thus compelled to make effects its purification in a very perfect manner; and that such an apparatus will be specially useful in situations where fuel is abundant, but where tallow and oil are with difficulty obtained.

What I claim as constituting my invention in the above described apparatus is—

The particular manner in which I have connected and combined the cylinders A, B, and D, with the tubes leading into and from them, so as to cause the gas generated from wood for the purpose of illumination to pass through the respective tubes and cylinders, in the manner and for the purpose set forth.

DANIEL GAMET.

Witnesses:
THOS. F. JONES,
J. M. BELL.